United States Patent [19]

Bohrn et al.

[11] Patent Number: 4,762,643

[45] Date of Patent: * Aug. 9, 1988

[54] BINDERS AND FIBERS COMBINED WITH FLOCCED MINERAL MATERIALS AND WATER-RESISTANT ARTICLES MADE THEREFROM

[75] Inventors: Walter J. Bohrn, Lancaster; Richard A. Brubaker, Willow Street; Shelly N. Garman, Lancaster; Lewis K. Hosfeld, Mountville; Thomas M. Tymon; Kenneth K. Ko, both of Lancaster, all of Pa.

[73] Assignee: Armstrong World Industries, Inc., Lancaster, Pa.

[*] Notice: The portion of the term of this patent subsequent to Nov. 17, 2004 has been disclaimed.

[21] Appl. No.: 58,800

[22] Filed: Jun. 5, 1987

Related U.S. Application Data

[63] Continuation-in-part of Ser. No. 829,017, Feb. 13, 1986, Pat. No. 4,707,298, which is a continuation-in-part of Ser. No. 662,057, Oct. 18, 1984, abandoned.

[51] Int. Cl.$^4$ .................... C04B 20/02; C04B 20/06
[52] U.S. Cl. ........................... 252/378 R; 252/315.5; 106/DIG. 3; 501/151; 501/95; 264/110; 264/DIG. 19
[58] Field of Search .................. 524/449; 521/35; 428/446, 454, 283; 252/378 R, 315.2, 315.5; 501/12, 36, 95, 151, 153, 154; 162/3, 9; 106/DIG. 3; 264/110, 204, DIG. 19

[56] References Cited

U.S. PATENT DOCUMENTS

| | | | |
|---|---|---|---|
| 2,248,636 | 7/1941 | Marsden | 501/80 |
| 2,795,545 | 6/1957 | Gluesenkamp | 252/8.515 |
| 3,001,571 | 9/1961 | Hatch | 428/454 |
| 3,325,340 | 6/1967 | Walker | 252/378 R |
| 3,356,611 | 12/1967 | Walker et al. | 252/378 R |
| 3,434,917 | 3/1969 | Kraus et al. | 162/3 |
| 3,540,892 | 11/1970 | Lard et al. | 252/608 |
| 3,597,248 | 8/1971 | Yates | 501/12 |
| 3,654,073 | 4/1972 | Lard et al. | 162/145 |
| 3,753,923 | 8/1973 | Wada | 252/378 R |
| 3,791,969 | 2/1974 | Patil et al. | 264/307 |
| 3,824,297 | 7/1974 | Wada | 252/378 R |
| 3,830,892 | 8/1974 | Wada | 252/378 R |
| 3,936,383 | 2/1976 | Daimon et al. | 428/446 |
| 4,133,665 | 1/1979 | Bartholomew et al. | 428/410 |
| 4,219,456 | 8/1980 | Langer | 252/601 |
| 4,219,609 | 8/1980 | Cundy | 428/446 |
| 4,239,519 | 12/1980 | Beall et al. | 501/7 |
| 4,271,228 | 6/1981 | Foster et al. | 428/288 |
| 4,297,139 | 10/1981 | Beall et al. | 501/4 |
| 4,421,815 | 12/1983 | Briggs et al. | 428/288 |
| 4,425,465 | 1/1984 | Padget et al. | 524/450 |
| 4,442,175 | 4/1984 | Flannery et al. | 501/12 |
| 4,450,095 | 5/1984 | Finlayson | 252/8.515 |
| 4,453,981 | 6/1984 | Taylor | 501/3 |
| 4,454,237 | 6/1984 | Hoda et al. | 501/12 |
| 4,455,382 | 6/1984 | Wu | 501/12 |
| 4,472,185 | 9/1984 | Wu | 501/12 |
| 4,480,060 | 10/1984 | Hoda et al. | 524/449 |
| 4,557,969 | 12/1985 | Berbner et al. | 428/288 |
| 4,559,264 | 12/1985 | Hoda et al. | 428/449 |
| 4,707,298 | 11/1987 | Tymon | 252/378 R |

FOREIGN PATENT DOCUMENTS 2475567 8/1981 France .
1119305 7/1968 United Kingdom .

OTHER PUBLICATIONS

M. M. Mortland et al., "Triethylene Diamine–Clay Complexes as Matrices for Adsorption and Catalytic Reactions", Clays and Clay Minerals, vol. 24, pp. 60–63, 1976.

M. Iltis et al., "Comparison of Action of KCl and Guanidine Hydrochloride Solutions on Montmorillonite Swelling," Society of Petroleum Engineers Journal, Aug. 1982.

Carl W. Beck et al., "X-ray and Infrared Data on Hectorite-Guanidines and Montmorillonite-Guanidines", Eighth National Conference on Clays and Clay Minerals.

Primary Examiner—William R. Dixon, Jr.
Assistant Examiner—Anthony J. Green

[57] ABSTRACT

Disclosed are compositions of flocced mineral materials combined with fibers and/or binders. These compositions may be utilized to prepare high temperature resistant, water resistant articles. These materials are prepared by utilizing, as a starting material, a gellable layered swelled silicate that has an average charge per structural unit that ranges from about $-0.5$ to $-1$ and which contains interstitial cations which promote swelling with a source of at least one species of an exchange cation that is derived from guanidine or compounds closely related thereto.

23 Claims, No Drawings

BINDERS AND FIBERS COMBINED WITH FLOCCED MINERAL MATERIALS AND WATER-RESISTANT ARTICLES MADE THEREFROM

CROSS-REFERENCE TO RELATED APPLICATION

This application is a continuation-in-part of U.S. application Ser. No. 829,017, filed Feb. 13, 1986, now U.S. Pat. No. 4,707,298 which in turn was a continuation-in-part of U.S. application Ser. No. 662,057, filed Oct. 18, 1984 in the name of Thomas M. Tymon, and entitled "Flocced Mineral Materials and Water-Resistant Articles Made Therefrom". U.S. application Ser. No. 662,057 has been abandoned.

BACKGROUND OF THE INVENTION

It is known that non-asbestos papers and/or sheets may be produced from water-swellable inorganic materials and, in particular, swelled silicate gels. For example, U.S. Pat. No. 4,239,519 is directed to the preparation of inorganic, crystal-containing gellable, water-swelling sheet silicates and certain articles, such as papers, fibers, films, boards, and coatings, produced therefrom. These non-asbestos papers and/or sheets exhibit good high temperature stability and good chemical resistance. Furthermore, since asbestos fibers are not utilized in their manufacture, such articles will not have the health hazards which are associated with asbestos containing articles.

U.S. Pat. No. 4,239,519 teaches the method for making the precursor gellable silicates used to produce said papers or sheet articles, as involving three fundamental steps: (a) a fully or predominantly crystalline body is formed which contains crystals consisting essentially of a lithium and/or sodium water-swelling mica selected from the grouof fluorhectorite, hydroxyl hectorite, boron fluorphlogopite, fluorphlogopite, hydroxyl boron phlogopite, and solid solutions between those and other structurally compatible species selected from the group of talc, fluortalc, polylithionite, fluorpolylithionite, phlogopite, and fluorphlogopite; (b) that body is contacted with a polar liquid, normally water, to cause swelling and disintegration of the body accompanied with the formation of a gel; and (c) the solid: liquid ratio of the gel is adjusted to a desired value depending upon the application therefor. Glass-ceramics are the preferred crystalline starting bodies. Those products are then contacted with a source of large cations, i.e., with an ionic radius larger than that of the lithium cation, to cause macro flocculation of the gel and an ion exchange reaction to take place between the large cations and the $Li^+$ and/or $Na^+$ ions from the interlayer of the crystals.

Alternatively, U.S. Pat. Nos. 3,325,340 and 3,454,917 teach producing aqueous dispersions of vermiculite flaked crystals which have been caused to swell due to the introduction therein of interstitial ions such as (1) alkylammonium cations having between 3 and 6 carbon atoms inclusive in each carbon group such as methyl-butylammonium, n-butylammonium, propylammonium, and iso-amylammonium, (2) the cationic form of aminoacids, such as lysine and ornithine, and/or (3) lithium.

While the articles, such as papers, sheets and films, prepared via the prior art processes set forth above exhibit excellent heat resistance and are very useful in a wide variety of applications, it has been discovered that they exhibit a certain amount of water sensitivity which is generally exhibited by the articles having a considerable loss of strength and general deterioration of mechanical and electrical properties when exposed to high humidity environments or submerged in water or other polar liquids. This sensitivity to water correspondingly curtails the utility of these articles in certain applications, such as, for example, head gaskets, electrical insulators, environmental protective coatings, printed wiring boards and washable and environmentally stable building materials.

SUMMARY OF THE INVENTION

It has now been unexpectedly discovered that high temperature, fire-resistant, non-asbestos, water-resistant articles, such as sheet, paper, board, film, fiber and coating articles, can be made from a swelled, layered flocced silicate gel material that is prepared by utilizing an exchange cation that is selected from derivatives of guanidine or closely related compounds thereto. Such articles surprisingly have been found to exhibit, in general, much improved results in tensile strength and puncture resistant tests that are conducted when the articles are wet than do otherwise similar materials that are prepared utilizing prior art exchange cations. Furthermore, the articles made according to the present invention generally display superior electrical and mechanical properties over those materials made by prior art methods.

With reference to heat resistance, the articles that are produced according to the present invention are completely stable to temperature of approximately 350°–400° C. and maintain their structural stability to approximately 800° C.

DETAILED DESCRIPTION OF THE INVENTION

The articles and the flocced mineral suspensions of the present invention are, in one embodiment of the invention, prepared by utilizing, as a starting material, a water-swelling silicate that has an average charge per structural unit of from about −0.5 to about −1 and which contains interstitial exchangeable cations that promote swelling. Said starting silicates will include, for example, synthetic and naturally occurring micas, vermiculite, and mixtures thereof. The specific exchange cations in the starting material will depend on the silicate being utilized. For example, if a synthetically derived gellable silicate, which is made, for example, according to the procedures of U.S. Pat. Nos. 4,239,519; 4,067,819; 4,045,241; or 3,936,383 (which latter three patents discuss, respectively, synthetic tetra-silicic micas, synthetic taeniolites, and a sol of synethic hectorites), is utilized as a starting material, the exchange cations will generally be $Li^+$ and/or $Na^+$ ions. If a natural vermiculite dispersion, such as made according to U.S. Pat. No. 3,325,340, is utilized, the exchange cations will generally include alkylammonium cations and the other cations specified in U.S. Pat. No. 3,325,340. The silicate, whether synthetic or natural in origin, will generally have morphologies that are represented by thin flakes which are generally disc, strip, and/or ribbons. The flakes will have typical measurements which are from about 500 A to 100,000 A, and preferably 5,000 A to 100,000 A in length, 500 A to 100,00 A in width, and less than 100 A thick. The term "charge per structural unit" as used in the specification and claims refers to an average charge density as specified by G. Lagaly and A. Weiss, "Determination of Layer Charge in Mica—Type Layer Silicates," Proceedings of International Clay Conference, 61-80 (1969) and G. Lagaly, "Characterization of Clays by Organic Compounds," Clay Minerals, 16, 1-21 (1981).

The starting silicate can be made according to the afore-mentioned procedures of U.S. Pat. Nos. 4,239,519; 3,325,340; or 3,434,917 or other methods which result in dissociated layer silicates with charge densities in the desired ranges. Silicates with charge densities higher than −0.5 (i.e., from about −0.4 to 0) will not, when utilized in the present invention, give articles that display good durability.

The silicate is then contacted with a source of at least one species of cations derived from quanidine or compounds closely related thereto to thereby effect an ion exchange reaction to occur between the cations and the interstitial ions. This ion exchange reaction may be carried out between the cations and the silicate material to thereby form a floc which is then utilized to form the articles of the present invention. In another embodiment of this invention, the starting silicate can be directly formed into a product, such as a lithium fluorhectorite fiber or film by using the procedures of U.S. Pat. No. 4,239,519, and a cationic exchange reaction utilizing the specified cations can be carried out with the product, such as by immersing the product into a solution of said cations. Thus, the ion exchange reaction may be carried out in situ during the actual forming process for the product.

The term "derivatives of guanidine and closely related compounds thereto" is utilized in the specification and claims to refer to compounds, and cations derived therefrom, that contain an aminomethyleneimine group =N—C(—)=N—, and especially an =N—C(—C)-=N— or =N—C(—N)=N— group and resonance structures derived therefrom, in which there is a delocalized double bond. More especially, the cations will have the Formula:

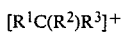

wherein $R^1$, $R^2$ and $R^3$ are independently selected from $NH_2$ and $CH_3$, provided that at least two of $R^1$, $R^2$ and $R^3$ are $NH_2$, and wherein one or more of the hydrogen atoms on any one or more of $R^1$, $R^2$ and $R^3$ may be replaced by substituents, for example $C_1$ to $C_5$ alkyl, $C_2$ to $C_5$ alkenyl or $C_2$ to $C_5$ alkynyl, and wherein one or more groupings of two of such substituents may be linked to form one or more rings, which may be saturated, unsaturated or aromatic. It will be appreciated that in the cation, there will be a positive charge which may be localized on one group or delocalized, giving a resonance structure, depending on the nature of the compound from which the cation is derived.

Examples of compounds from which the cations may be formed are guanidine, aminoguanidine, diaminoguanidine, methylguanidine, tetramethylguanidine, melamine, 2-aminopyridine and 2,6-diaminopyridine. The compounds may conveniently be used in the form of their hydrochlorides.

The flocced mineral suspensions of the present invention are prepared, for example, by reacting, generally with agitation, a suitable silicate gel with a source of exchange cations derived from the guanadine compounds set forth in the Formula above in order to effect an ion exchange between the guanidine derived cations and the interstitial cations in the silicate gel to form exchanged macro flocculated particles. For example, if the exchange cation of choice is guanidinium or melaminium, the silicate will be reacted with the corresponding hydrochloride or any other corresponding compatible soluble salt.

As stated above, one or more exchange cations that are derived from the Formula above can be utilized in the cationic exchange reaction. Since the various cations will give floc, and eventually end products, with differing physical properties, the specific cation or combination of cations will be chosen by the practitioner of this invention based on the desired end use.

The flocced mineral suspension will be used to form the desired end products. The specific treatment steps applied to the floc will depend on the particular article being formed. For example, if the articles of the present invention are to be formed into sheet materials, the resultant exchanged floc will be agitated with sufficient shear to produce a particle size distribution which leads to suitable particle packing in the sheet forming operation. Following this process the floc is optionally washed to remove any excess salt solution and the consistency of the flocced slurry is adjusted to from about 0.75% to about 2% solids. To promote better drainage rates on a fourdrinier wire, polyelectrolyte flocculating agents can then be added to the slurry at a level of from about 0.1% to about 1%, and preferably 0.2%–0.3% of floc solids. One example of a suitable polyelectrolyte flocculating agent is Polymin P, which is a trademark of BASF Corporation for a polyethylene imine.

This slurry is then fed to a papermaking apparatus where it is dewatered by free drainage and/or vacuum drainage followed by pressing and drying on drum driers. The thus formed sheet material can be used in applications such as gaskets and the like.

If desired, and depending on the intended end use of the product, additional materials may be added to the flocced mineral suspension. For example, if desired one or more fibrous materials from the group of natural or synthetic organic fibers or inorganic fibers may be added to the floc to improve its drainage rate and to provide an end product that has improved strength and/or handleability. For example, when the desired end products are gaskets, the fibers of choice are cellulose fibers, glass fibers, and/or Kevlar fibers (Kevlar is a trademark of DuPont Corporation for an aromatic polyamide fiber). In addition, latex or other binders may be added to the floc to provide for a product with improved strength characteristics.

The addition of materials to the slurry of silicate starting material can be especially useful depending upon factors such as intended use and processing steps planned for the flocced material.

If, for example, the cationic exchange reaction is conducted directly on a product formed from the silicate starting material, any desired additional materials could be added to the slurry of the silicate starting material prior to the formation of the product and, of course, the subsequent cationic exchange reaction.

All forms and types of fibrous material, such as loose fibers, fibrous substrates, and non-woven fibrous substrates can be utilized in the instant silicate materials. The fibers themselves, for example, can be short-cut or crimped. The fibrous material and silicate floc combination can be prepared by either combining the fibrous material with the silicate starting material followed by flocculation or the fibrous material can be added to the floc. The fibrous material can be organic, inorganic, or mixtures thereof. Organic fibers can be either natural, which are generally made of a cellulosic material; or the organic fibers can be synthetic, generally made of a polymeric material.

Polymeric substances can be also be made into fibers by suitable methods available in the art. The polymeric material which can be used to provide the fibrous material suitable to be combined with the silicate starting material or combined with the instant floc can be a latex or a resin. The polymer, further, can be thermoplastic or thermoset.

Representative but non-exhaustive examples of polymeric materials which can be made into fibers and used with the starting material or the instant floc can be selected from the group consisting of: carboxylated NBR (acrylonitrile butadiene), polyvinylidene chloride, polystyrene, polystyrene butadiene, polyvinyl chloride, carboxylated polybutadiene styrene, fluorinated polymers such as fluorinated polypropylene, fluorinated polyethylene, and fluorinated copolymers of polyethylene and propylene, polyamide, polyamide-imides, polyether-imides, polyaryl sulfone, polyether sulfone, polyether-imide, polyphenylene oxide, polycarbonates, polybenzimadazole, polyacrylates, polyphenylene sulfide, polyesters, polyarylate, phenolic polymers, arimide polymers, and acetate polymers. Other suitable fibers which are frequently encountered and which can also be used include rayon and nylon. Polybenzimidazole fibers are particularly preferred.

Inorganic fibers can also be prepared by methods available in the art and combined with either the starting material or the instant floc. Representative but non-exhaustive examples of inorganic fibers which can be used can be made of material selected from the group consisting of: silicon, boron, carbon, ceramic, glass, and metal. Some other fibers which could be used could be prepared from mineral slag and rock materials.

Binders can likewise either be added to the silicate starting material (gel or suspension) followed by flocculation, or binders can be combined with the floc.

Depending upon the binder selected, it may sometimes be desirable to add additional materials such as curing agents, surfactants, or stabilizers. It may also be necessary to subject the flocced material to heat in order to fuse the binder.

Binders which are frequently used are polymers. Polymers include resins and latexes. Both thermoplastic and thermoset polymers are available. A preferred group of polymeric binders are the latexes. Representative but non-exhaustive examples of latex binders which can be used can be selected from the group consisting of: carboxylated acrilonitrile butadiene, polyvinylidene chloride, polystyrene, styrene-butadiene latex, vinyl chloride latex, caboxylated butadiene styrene latex, fluorinated ethylene-propylene latex, acrylic latex, and tetrafloroethylene latex.

Representative but non-exhaustive examples of other polymeric binders can be selected from the group consisting of: polyamide, polyamide-imide, polyetherimide, polysiloxanes, polyaryl sulfones, polyether sulfones, polyether-imide, polyphenylene oxide, poly carbonates, polyacrylate, polyphenylene sulfide, polyether ketone, polybutylene terephthalate, polyethylene, polyethylene terephthalate, polypropylene, polypropylene terephthalate, polyarylate, and polyesters.

Another source of preferred binders are phenolic resins, melamine formaldehyde resins, and mixtures thereof.

Other materials which can also be used as binder and which are sometimes classified with polymeric materials are organic oligomers. Organic oligomers are organic molecules having molecular weights and repeating unit numbers less than polymeric materials. Typically, organic oligomers have molecular weights less than 50,000 and repeating units greater than 2 but less than 25. Such materials can also be selected as binders with the instant compositions. One such preferred material is epoxy.

While binders can acceptably be used in amounts varying as much as from about 0.5 to about 80% by weight of the total solids materials (i.e., the silicate binder, fibers and the like) a preferred range for the amount of binder to be used is from about 0.5 to about 45% by weight of the total solids and most preferably the binder is used in an amount of from about 1 to about 35% by weight of the total solids.

The term "water resistant" as used in the specification and claims is not meant to imply that the articles of the present invention are waterproof or are completely impervious to water. By contrast, the term is used to indicate that the materials do not substantially degrade, at least in their tensile strength and puncture resistant properties, when exposed to water.

The instant invention can perhaps be better understood from the examples that follow. These examples, however, are offered to illustrate the instant invention and should not be taken to limit it.

In these following Examples, unless otherwise specified, the starting material utilized was a lithium fluorhectorite made according to procedures taught in U.S. Pat. No. 4,239,519.

EXAMPLE 1

This example illustrates a method of producing both a guanidinium exchanged fluorhectorite flocced silicate and a formed sheet that was prepared therefrom.

A slurry of guanidinium fluorhectorite was prepared by adding 475 grams of a 10% dispersion of lithium fluorhectorite to 1.4 liters of 1N guanidine hydrochloride solution. The slurry was then agitated with a high shear mixer to reduce the particle size of the resultant floc, was washed and then was analyzed for water content and diluted to result in a 2% solids slurry. The slurry was transferred to a 11.5"×11.5" hand sheet mold (manufactured by Williams Apparatus Co.) and dewatered. The resultant formed sheet was then wet pressed and dried on a drum drier. The sheet had good flexibility and performed well in the gasket sealing test.

EXAMPLE 2

This example illustrates a method of producing films of the present invention wherein the cationic exchange is made in situ.

A 10% solids lithium fluorhectorite gelled dispersion was prepared according to procedures taught in U.S. Pat. No. 4,239,519. A film was made of this material by using a 4.5 mil Byrd applicator, which was 5 inches wide, to draw down a 4½ mil thick wet film of the dispersion on a glass plate. The glass plate, with the film attached, was then immersed in a 0.25M guanidinium hydrochloride solution to caused a cation exchange between the guanidinium cations and the fluorhectorite's interlayer cations. A skin was formed, seemingly instantaneously, on the film which indicated such an exchange was taking place. In 10 minutes the film was removed from the plate, washed in deionized water to remove residual salts, and dried. The film had good flexibility and strength retention when wet.

EXAMPLES 3-9

For each of these examples, the procedure of Example 2 was substantially repeated with the exchange cation was specified to form the corresponding film. In Example 7, a 0.1N solution of melamine hydrochloride was employed. In all the other examples, a 0.25N solution of the respective exchange source was employed:

| Example | Exchange Cation |
|---|---|
| 3 | Diaminoguanidine hydrochloride |
| 4 | Aminoguanidine hydrochloride |
| 5 | Tetramethylguanidine hydrochloride |
| 6 | Methylguanidine hydrochloride |
| 7 | Melamine hydrochloride |
| 8 | 2,6-diaminopyridine hydrochloride |
| 9 | 2-aminopyridine hydrochloride |

COMPARATIVE EXAMPLES 1-3

These comparative examples illustrate fluorhectorite films that are made with various prior art exchange cations. Four and one half mil thick films of potassium fluorhectorite (KFH) and ammonium fluorhectorite (NH$_4$FH) were separately prepared by the procedure of Example 2, varying only in the specific exchange cation utilized. A film was then cast of both the KFH and a NH$_4$FH slurry. A Kymene (a trademark of Hercules, Inc. for a cationic, polyamide-epichlorohydrin resin) fluorhectorite film was also prepared by the procedure of Example 2, except that (1) a 3.0% Kymene solution was used and (2) the lithium fluorhectorite film had to be immersed in the Kymene solution for 2 hours until the resultant exchanged film was sufficiently self-supporting to be removed from the glass plate. These films, along with the films made in Examples 2-9, were then subjected to tensile strength and puncture resistance tests which were conducted as follows:

TENSILE STRENGTH MEASUREMENTS

Dry tensile strength measurements were determined using an Instron at 1½" jaw separation and 0.2"/min. crosshead speed. Wet strength measurements were made by bringing water-saturated sponges in contact with both sides of the film sample for 10 seconds while the sample was positioned in the Instron clamps just before the strength test was conducted.

PUNCTURE RESISTANCE MEASUREMENTS

Sample of film was secured in a retaining device which held the film securely. A stylus which could be loaded was impinged on the film in the direction normal to the surface of the film and loaded with increasing weight until the stylus penetrated the film. In the wet test the film in the retaining device was submerged in deionized water for 10 seconds immediately proceeding the puncture resistance test.

The data from these tests is shown in the table below.

TABLE

| Exchange Cation | Tensile Strength (psi) | | Puncture Resistance (gr/mm) | |
|---|---|---|---|---|
| | Dry | Wet | Dry | Wet |
| Film of Example Number | | | | |
| 2  Guanidinium | 14,000 | 9,000 | 7,100 | 4,600 |
| 3  Diaminoguanidinium | 13,000 | 11,000 | 14,000 | 4,200 |
| 4  Aminoguanidinium | 13,000 | 11,000 | 8,900 | 3,500 |
| 5  Tetramethylguanidinium | 11,000 | 11,000 | 13,000 | 4,400 |
| 6  Methylguanidinium | 5,200 | 2,800 | 6,600 | 3,400 |
| 7  Melaminium | 19,000 | 20,000 | 10,000 | 3,300 |
| 8  2,6-Diaminopyridine (protonated) | 13,000 | 5,300 | 7,900 | 3,600 |
| 9  2-Aminopyridine (protonated) | 11,000 | 7,000 | 7,800 | 3,600 |
| Comparative Example # | | | | |
| 1  Kymene (protonated) | 7,000 | 2,700 | 900 | 260 |
| 2  Ammonium | 3,300 | 1,400 | 3,500 | 680 |
| 3  Potassium | 1,100 | 200 | 3,300 | 440 |

The data indicates that the films made according to the procedures of the present invention have markedly superior wet tensile strength and/or superior wet puncture resistance when compared to prior art compositions.

FIRE AND SMOKE RESISTANCE

A film prepared according to Example 2 was, after being dried, subject to fire and smoke resistant tests in accordance to the procedures specified in ASTM-E-662-79. Three separate tests were made and the results are set forth below. The numerical values correspond to the maximum specified optical density as per N.B.S. Technical Note #708.

| Test # | Flaming DM Corr | Smoldering DM Corr |
|---|---|---|
| 1 | 2 | 0 |
| 2 | 1 | 0 |
| 3 | 1 | 0 |

ELECTRICAL PROPERTIES

Films of Examples 2 and 7 and Comparative Example 3 were, when dried, tested for dielectric strength using the procedures of ASTM D149. The results are set forth below.

| Films of | Dielectric Strength (v/mil) |
|---|---|
| Example 2 | 5,000 |
| Example 7 | 9,000 |
| Comparative Example 3 | 2,920 |

COMPARATIVE EXAMPLES 4 AND 5

These examples illustrate using, as a starting material, silicate materials which fall outside the scope of the present invention in their charge per structural unit and their physical measurements.

For comparative Example 4, a 10% aqueous dispersion was made from a natural hectorite obtained from the source clay minerals depository of the Clay Minerals Society, Bloomington, Ind. For Comparative Eaxmple 5, a 10% aqueous dispersion utilizing sodium montmorillonite, which was obtained from the same source. In each example, a film was drawn down using the procedures set forth in Example 2. The glass plates were then immersed for 10 minutes in a 0.25 M guanidine hydrochloride solution. In both instances, a coherent film was not produced.

EXAMPLE 10

This example illustrates a method of preparing a film of the present invention utilizing a vermiculite starting material:

A 10% solids suspension of n-butylammonium vermiculite, which was prepared according to the procedures specified in U.S. Pat. No. 3,325,340, was cast as a film on a glass plate according to the procedure set forth in Example 2. The glass plate, with the film attached, was immersed for 10 minutes in a 0.25 M guanidinium hydrochloride solution. The resulting film was removed from the plate, washed, and dried. The film displayed wet strength in the tensile strength and puncture resistance tests that a comparable unexchanged vermiculite film does not display.

EXAMPLE 11

This example illustrates preparing fibers utilizing the method of the invention. A 15% solids suspension of lithium fluorhectorite (prepared as above) was extruded through an 11 mil opening needle into a 2N solution of guanidine hydrochloride. The extruded fiber was carried by a porous belt and delivered to a second bath of 2N guanidine hydrochloride. The fiber so produced was washed via submersion in deionized water and dried. The resultant fiber was strong and flexible.

EXAMPLE 12

Seven grams (g) of a carboxylated NBR latex at 42% solids (Reichold) was added to 150 g of a 10% solids lithium fluorhectorite dispersion. The mixture was allowed to stir for about 2 hours forming a stable dispersion containg the synthetic mica and the latex. A film was then made with this dispersion using a 4.0 mil Bird applicator to draw down a film of the dispersion of a glass plate. The glass plate with the film attached was then immersed in a 0.2 M (molar) guanidine hydrochloride solution which was at 60° C. A skin began to form immediately on the film. The film was allowed to stay in the bath for an additional 15 minutes. The glass plate with the film attached was then removed from the salt solution and was washed with deionized water and air-dryed. It should be noted that upon removal for the film from the salt bath, that the salt bath which had been clear, was now somewhat milky white, indicating that some of the latex initially mixed in the silicate dispersion had washed out upon submersion of the film into the salt bath. Shown below are the puncture strengths of the film prepared above and a comparison to a guanidinium fluorhectorite film prepared from a 10% lithium fluorhectorite dispersion containing no latex. (The same apparatus and method was used to prepare the flocculated guanidinium fluorhectorite film as is described above for the guanidinium fluorhectorite NBR latex film.)

PUNCTURE RESISTANCE TEST

A sample of the prepared film was secured in the retaining device which held the film securely. A stylus which could be loaded was then impinged on the film in the direction normal to the surface of the film and loaded with increasing weight until the stylus penetrated the film. The results of the test are recorded in grams per millimeter.

TABLE 1

| Film | Dry Puncture Resistance (gr/mm) |
|---|---|
| Guanidinium Fluorhectorite | 7,100 |
| Guanidinium Fluorhectorite/NBR Latex | 8,200 |

As seen, the film containing the NBR latex is slightly higher in puncture resistance than the film containing no latex.

EXAMPLE 13

In order to test how effective the salt solutions are in flocculating the latex, the following experiments were run. 0.25 g of the NBR latex was added to 100 ml. of 0.2M. 0.25M, 0.35M, and 0.5M solutions of guanidinium hydrochloride 1,6 hexanediammonium. Also, in another set of experiments 4 g of lithium fluorhectorite at 10% solids was added to 100 mls. of a 0.2, 0.25M, 0.35M, and 0.5M solutions of guanidinium hydrochloride solutions. The appearance of the salt solution and the material added (i.e., the latex and silicate) to the salt solutions were monitored. The observations are shown in Table 2. As seen, guanidinium solutions are capable of flocculating the fluorhectorite. On the other hand, the flocculation of the latex is highly dependent on the concentration of the solution. When coflocculation is desired, the type of latex, flocculant selected and the concentration of the flocculation in the solution is important.

TABLE 2

| Guanidinium Hydrochloride Salt Solution Concentration | Appearance After NBR Latex was Added | Appearance After Lithium Fluorhectorite was Added |
|---|---|---|
| .20 Molar (M) | salt bath milky portion of latex flocculated | salt bath clear silicate flocculated |
| .25 M | salt bath slightly milky portion of latex flocculated | salt bath clear silicate flocculated |
| .35 M | salt bath clear latex flocculated | salt bath clear silicate flocculated |

EXAMPLE 14

Example of silicate/epoxy film composite with topical application of a resin adhesive.

A dispersion of lithium, taeniolite (LiTn) (see note 1 which follows) and the water dispersible epoxy CMD W60-5520, a non-ionic dispersion of a urethane modified bisphenol A epoxy resin (having an epoxide equivalent weight of 540 and solids content of 60%) was prepared in the following manner:

LiTn powder was sieved through a 75 micron screen and the average particle size was found to be 22 microns. Then, 36 g of this powder was dispersed in 264 g of water using a homogenizer. To this dispersion, 13.8 g of the epoxy dispersion was added while mixing. After moderate mixing, the dispersion was allowed to stand for a period of time to allow entrapped air to escape.

Then, using a Bird blade as previously described, films of this dispersion were prepared and a flocculating cation exchange bath consisting of 0.2N melamine hydrochloride (pH of 3.5) at a temperature of 55°–60° C. was used. The final dried film contained 15% by weight of the epoxy resin and had an X-Y axis CTE value of 6 PPM/°C.

A sample of the above film was dip coated with the above epoxy resin dispersion to a wet pickup of 21% resulting in a total epoxy resin content of 28%–15% internally applied and 13% externally applied. After air drying and prebaking, 8 plies of the coated film were hot pressed to produce a laminate 21 mils thick and having an X-Y coefficient of thermal expansion (CTE) of 14 PPM/°C. A similar laminate prepared with 25% internal resin binder and having no external resin coating had a CTE value of 7.5 PPM/°C. (a desirably low value).

(1.A synthetic fluoromica from Topy (Japan))

This shows that in order to lower the thermal expansion, it is advantageous to include the resin in the composition, thus avoiding topical application. Thermal expansion values for these compositions having the internal resin binder is desirably lower than the composition using the external resin binder. A low thermal expansion is desired for electrical uses.

EXAMPLE 15

Part I

An inorganic paper-like composite was prepared by coating, using a 4.5 mil Bird blade, an 8½"×11" 4 mm thick non-woven glass mat with a 10% lithium fluorhectorite suspension. The coated glass mat was then immersed into 1000 mls. of a 0.25M aqueous 60° C. solution of guanidine hydrochloride for 10 minutes resulting in the flocculation of the fluorhectorite via an ion exchange process. The guanidinium fluorhectorite mat was then removed from the salt solution and washed with fresh water in order to remove any excess salt. The coated mat was then air dried resulting in a flexible smooth inorganic paper which was white in color.

Part II

8½×11 inch guanidinium fluorhectorite films were formed by drawing down a 10% lithium fluorhectorite suspension with a 4.5 mil Bird blade onto an 8½×11 inch glass plate followed by immersion of the coated plate into 1000 mls of a 0.25M aqueous 60° C. guanidine hydrochloride solution to flocculate the silicate. After 10 minutes in the salt solution, the glass plate containing the film was removed and excess salt was washed from the film by soaking it in a bath containing fresh water. Two guanidinium fluorhectorite films prepared in this manner were then laminated, one on each side of the guanidinium fluorhectorite mat which was prepared as described above in Part I. The films and mat were compressed together while wet using a roller press laminator. The resulting laminated guanidinium fluorhectorite mat was a smooth inorganic paper-like composite which was white in color.

EXAMPLE 16

An aqueous slurry was prepared using 500 ml amount of water and the following materials:

| | |
|---|---|
| Vermiculite gel (87% solids) | 8.8 g |
| O-C-10 Fiberglass | 3.5 g |
| Fiberglass 1/16" | 1.8 g |
| PBI ¼" | 0.9 g |
| Total | 15.0 g |

This slurry was added to the following solution: 80 g of guanidinium hydrochloride and 4 liters of $H_2O$ and the vermiculate was flocculated.

The water was drained and the solids materials were pressed at 600 psi and dried into a hand sheet.

The hand sheet was tested. The tests and data collected are given below:

Data:
1. Fold (Mit"17 dbl folds TAPPI Test Method T-423)
2. Heat Stability: 3.8% loss of weight @750° F.
3. Water Absorption:
   (a) 160% by weight absorption of $H_2O$ after two hours of immersion in $H_2O$.
   (b) 189% by weight absorption of $H_2O$ after 24 hours immersion in $H_2O$.
4. Tensile Strength: 710 psi tested by TAPPI Test T-494
5. Tear Strength: 64 grams (g) tested by TAPPI Test T-414
6. Elongation: At break 1.65% (TAPPI T-494)

EXAMPLE 17

An aqueous slurry was prepared using 500 ml amt. of water and the following solids materials:

| | |
|---|---|
| Vermiculite Gel (8% solids) | 5.3 g |
| Fiberglass (10%) | 2.3 g |
| PBI ¼" | 0.6 g |
| Total | 8.2 g |

This slurry was added to the following solution: 80 g of guanidinium hydrochloride and 4 liters of $H_2O$.

The vermiculite was flocculated. The water was drained, and the solids materials were then pressed at 600 psi and dried into a hand sheet. The hand sheet was then tested. The tests made and the data collected are given below.

Data:
1. MIT Fold Test 20 double folds
2. Heat Stability: 4.5% loss of weight at 750° F.
3. Water Absorption:
   (a) 151% by weight absorption of $H_2O$ after two hours of immersion in $H_2O$.
   (b) 181% by weight absorption of $H_2O$ after 24 hours of immersion in H2O.
4. Tensile Strength 887 psi
5. Tear Strength 80 g (tested by TAPPI Test Method T-414)
6. Elongation at break 2.2% TAPPI Test T-494

EXAMPLE 18

An aqueous slurry was prepared using 500 ml. of water and the following solids materials:

| | |
|---|---|
| Vermiculite gel (8% solids) | 7.9 g |
| Fiberglass 10% solids | 3.15 g |
| Fiberglass 1/16" | 1.6 g |
| PBI ¼" | 0.8 g |
| Polyvinylidinechloride (Geon 660X13) | 1.5 g |
| Total | 15.0 g |

This slurry was added to the following solution: 80 g of guanidinuim hydrochloride and 4 liters of H2O.

The vermiculite was flocculated. the water was drained, and the solids materials were then pressed at 600 psi and dried into a hand sheet. The handsheet was then tested. The tests made and the data collected are given below.

Data:
1. MIT Fold Test 37 double folds
2. Heat Stability: 9.6% loss of weight at 750° F.
3. Water Absorption:
   (a) 127% by weight absorption of H2O after two hours of immersion in H2O.
   (b) 174% by weight absorption of H2O after 24 hours of immersion in H2O.
4. Tensile Strength 1080 psi (Tested by TAPPI Test Method T-494)
5. Elongation at break—1.47%
6. Tear Strength—80 g. (Tested by TAPPI Test Method T-414).

EXAMPLE 19

An aqueous slurry was prepared using 500 ml. of water and the following solids materials:

| | |
|---|---|
| Vermiculite Gel (8% solids) | 12.0 g |
| PBI ⅛" | 0.1 g |
| PBI ¼" | 0.2 g |
| PBI ½" | 0.1 g |
| PVDCI Geon 660X13 | 1.13 g |

This slurry was added to the following solution: 80 g of guanidinium hydrochloride and 4 liters of H2O.

The vermiculite was flocculated. The water was drained, and the solids materials were then pressed at 600 psi and dried into a hand sheet. The hand sheet was then tested. The tests made and the data collected are given below.

Data:
1. MIT Fold Test 55 double folds
2. Heat Stability: 10.1% loss of weight at 750° F.
3. Water Absorption:
   (a) 34% by weight absorption of H2O after two hours of immersion in H2O.
   (b) 54% by weight absorption of H2O after 24 hours of immersion in H2O.
4. Tensile Strength 973 psi
5. Tear Strength 32 g (tested by TAPPI Test Method T-414)
6. Elongation at break 3.63% TAPPI Test T-494

EXAMPLE 20

An aqueous slurry was prepared using 500 ml. amt. of water and the following solids materials:

| | |
|---|---|
| Vermiculite Gel (8% solids) | 7.5 g |
| Fiberglass | 3.0 g |
| PBI 1/16" | 1.5% |
| PBI ¼" | 2.25% |
| Total | 15 g |

This slurry was added to the following solution: 80 g of guanidinium hydrochloride and 4 liters of H2O.

The vermiculite was flocculated. The water was drained, and the solids materials were then pressed at 600 psi and dried into a hand sheet. The hand sheet was then tested. The tests made and the data collected are given below.

Data:
1. MIT Fold Test 18 double folds
2. Heat Stability: 9.2% loss of weight at 750° F.
3. Water Absorption:
   (a) 141% by weight absorption of H2O after two hours of immersion in H2O.
   (b) 178% by weight absorption of H2O after 24 hours of immersion in H2O.
4. Tensile Strength 983 psi
5. Tear Strength 64 g (tested by TAPPI Test Method T-414)
6. Elongation at break 1.74% TAPPI Test T-494

EXAMPLE 21

Vermiculite paper of the following composition was manufactured on a Fourdrinier pilot plant machine:

| | |
|---|---|
| Vermiculite (Regenerated) | 76.4% |
| PBI (Polybenzimidazole) fibers | 17.6% |
| PVDC (Polyvinyliden chloride) binder | 6.0% |
| TOTAL | 100.00% |

Procedure

The following fiber slurry was prepared in a standard paper-making beater:

| | |
|---|---|
| PBI Fibers, ¼" and ½" Lengths | 8.8 Lbs. |
| Water-Deionized | 63.4 Gals. |

The fibers were beaten for ten minutes.

The following mixture was prepared in a standard Hydrapulper.

| | Dry Weight | Wet Weight |
|---|---|---|
| Vermiculite Gel | 38.2 Lbs. | 478 Lbs. |
| PBI fiber Slurry (Above) | 8.8 Lbs. | |
| PVDC Latex (50% Solids) | 3.0 Lbs. | 6 Lbs. |
| | 50.0 Lbs. | |

The gel and fibers were first mixed together in the hydrapulper for ten minutes; then the latex was added and the resultant mixture was stirred for one minute more.

The next step, flocculation, was performed by pumping the above mixture into a precipitation tank, which contained the following:

| | |
|---|---|
| Water-Deionized | 500 Gallons |
| Guanidine Hydrochloride | 80 Lbs. |
| Alum (Papermaker's) | 1.5 Lbs. |
| Soda Ash | 1.35 Lbs. |

The total volume of the resultant stock was adjusted to 750 gallons of 0.8% consistency. After a further period of mixing, the stock was pumped to the headbox of the paper forming unit. Paper of 10 mil thickness was then manufactured. The paper was 25" in width and was collected onto rolls after traveling over the drying drums of the paper manufacturing line.

The resultant paper was tested and found to have the properties listed below. The tests performed are standard tests used in this field. (TAPPI stands for Technical Association of Paper and Pulp Industries, the test and its designated identification number is listed along with the results.

| Test | Result |
|---|---|
| Thickness TAPPI T-411 | 0.010" |
| PH (cold extraction) | 7.1 |
| Water Absorpton (TAPPI) T-492 | 2 hr. 34% |
| | 24 hr. 44% |
| Tensile Strength (TAPPI) T-494 | MD 1433 psi |
| | AMD 1194 psi |
| Elongation at Break T-494 | MD 2.6% |
| | AMD 3.4% |
| Elmendorf Tear TAPPI T-414 | MD 184 g |
| | AMD 176 g |
| MIT Fold (TAPPI) T-423 | MD 4214 dbl folds |
| | AMD 3060 dbl folds |
| Mullen Burst (TAPPI) T-403 | 42 psi |
| Density (TAPPI) T-410 | 42 pcf |
| Dielectric Strength ASTM D-149 | 424 v/mil |
| Calendered | 750 v/mil |
| Toughness Index | MD 371 J/kg |
| | AMD 434 J/kg |
| Wax Pick Test (TAPPI) T-459 | 6, pulls at 7 |
| Limiting Oxygen Index (LOI) | Does not burn in 100% oxygen. |
| Moisture at | |
| 65% RH | 2.8% |
| 50% RH | 2.0% |
| Specific Heat Capacity | 0.36 cal/g. degree C. |
| Volume Resistivity | 3.75 × 10$^9$ ohm · cm |
| Radiant panel Test E-162 | |
| Flame Spread Factor | 1.00 |
| Heat Evolved | 3.21 |
| Flame Spread Index | 3.21 |
| NBS Smoke Test E-662 | |
| Smoldering | 7 |
| Flaming | 8 |
| Mean | 7 |
| Vertical Burn Text F-501 | |
| 12 second duration | |
| Extinguish time | 0 seconds |
| Burn length | 2.4 sec. |
| Glowing | 0 sec. |
| Dripping | 0 sec. |
| Pass/Fail | P |

MD — Machine Direction
AMD — Across Machine Direction

EXAMPLE 22

The following materials were combined with (500 mL) of water and stirred to form a dispersion:

| Vermiculite | 13.65 g |
|---|---|
| PBI ⅛" | 0.1 |
| PBI ¼" | 0.4 g |
| PBI ½" | 0.3 g |
| Polyvinylidine chloride | 0.5 g |
| | 14.95 |

This dispersion was then added to the following solution:

| Guanidine HCl 80 g/in 4 liters (1) of H$_2$O |
|---|
| 5 cc 10% Alum |
| 8 cc 10 Na$_2$CO$_3$ |

Upon combination of the solutions, the polyvinylidine chloride and vermiculite were flocculated. The resultant mixture was stirred for one minute and then drained. The flocculated product was then pressed at a wet press pressure of 600 psi into a paper sheet of approximately 10 mil thickness.

The tensile strength was measured (TAPPI T-494) at 1593 psi.

Tear strength was measured using Elmendorf Tear (TAPPI T-414) Test, and was measured at 64 g.

The MIT Fold Test (TAPPI T-423) was performed and found to be 1588 double folds.

Elongation at break was also measured with the TAPPI method of T-494 at 3.9%.

The Mullen Burst Test (TAPPI T-403) was performed and measured at 31 psi.

EXAMPLE 23

A dispersion was prepared using 500 ml. of water with the materials listed in Group I. This dispersion was then added to the flocculating agent described in Group 2. A flocculated product was obtained, drained, subjected to aspirator pressure vacuum for seventeen second drain time and wet pressed into a paper sheet at a gauge pressure of 600 lbs. wet press conditions. The sheet was dried and tested. The tests and results are indicated below.

| Group I | |
|---|---|
| Vermiculite | 7.9 g |
| Owens-Corning (10) Fiberglass | 3.15 |
| Owens-Corning (1/16") Fiberglass | 1.6 |
| Polybenezimidazole | |
| (PBI) ⅛" length | 0.2 |
| PBI ¼" | 0.4 |
| PBI ½" | 0.2 |
| Polyvinylidene chloride (Geon ® 660 × 13) | 1.5 |
| Group II | |
| Guanidine HCl 80 g/4L H2O | |
| 5 cc 10% Alum | |
| 8 cc 10% Na2CO3 | |
| Tests and Results | |
| Tensile Strength | 824 psi |
| Elmendorf Tear Strength | 64 g |
| Elongation Tensile | 1.3% |
| Mullen Burst | 18 psi |
| MIT Fold | 11 dbl folds |
| Water Absorption | 115%, 137%, 24 hr. |

EXAMPLE 24

36 g of lithium taeniolite, a synthetic mica, having an average particle size of 22 microns was homogenized in 264 g of deionized water to produce a dispersion at 12% solids. Then, 9 g of a bismaleimide-type polyimide resin (Kerimid ™ —601 powder available from Rhone Roulenc Co.) was added and the dispersion was homogenized at high speed for 15 minutes. A 10 mil wet film was cast from the pale yellow dispersion in the manner described in Example 1.

The film was then flocculated by immersing it in a 0.2N solution of melamine hydrochloride solution (pH of 3.5) at a temperature of 55–60°.

Air drying at ambient temperature resulted in a pale yellow film that was 2.4 mils thick.

8 plies of the above film were hot pressed at 50 psi for one hour at a temperature of 175° C. to complete crosslinking. The tan colored laminate so produced had a thickness of 21 mils and a density of 75 lbs/cu. ft. The Tg of the laminate composite was found to be 270° C. as measured by DSC (Differential Scanning Calormeter).

The laminate was fairly resistant to fracture and, more importantly, did not delaminate upon fracturing. In comparison, a similar laminate not containing the polyimide binder was topically coated with the Kerimid ® polyimide applied from N-methylpyrollidone solution and exhibited internal delamination when fractured.

EXAMPLE 25

The following ingredients were combined with 500 milliliters (mL) of water:

| Formula | |
|---|---|
| Vermiculite | 12.74 g. |
| PBI ¼" | 1.13 g. |
| Acylonitrile (Hycar ® 1562) Latex | 1.13 g. |

After stirring to form the dispersion, these ingredients were added to the following aqueous solution of cationic flocculant:

| | |
|---|---|
| Guanidine HCL 80 g/4 liters (4L) H₂O | |
| 5 cc 10% alum | |
| 8 cc 10% NACO (base) | |

Flocculation took place and the resulting slurry was gravity drained and the material was made into a sheet of paper on a wet press with a 600 psi g. (gauge) pressure.

The resulting paper was 0.007" (inch) thick. The following data was collected in testing the paper:

| Data | |
|---|---|
| Tensile Strength (T-494) | 1921 psi |
| Tear Strength (T-414) | 96 g. |
| Fold MIT (T-423) | +5000 dbl. folds |

Water Absorption: 34.8% by weight after 24 hr. exposure.

EXAMPLE 26

The following ingredients were combined with 500 milliliters (ml.) of water:

| Formula | |
|---|---|
| Vermiculite | 12.74 g. |
| PBI ¼" | 1.13 g. |
| Acylonitrile (Hycar ® 1561) Latex | 1.13 g. |

After stirring to form the dispersion, these ingredients were added to the following aqueous solution of cationic flocculant:

| | |
|---|---|
| Guanidine HCL | 80 g/4 liters (4L) H2O |
| 5 cc 10% alum | |
| 8 cc 10% NA2CO3 (base) | |

Flocculation took place and the resulting slurry was gravity drained and the material was made into a sheet of paper on a wet press with a 600 psi g. (gauge) pressure.

The resulting paper was 0.006" (inch) thick. The following data was collected in testing the paper:

| Data | |
|---|---|
| Tensile Strength | 2022 psi |
| Tear Strength | 75 g. |
| Fold MIT | +5000 dbl folds |

Water Absorption: 38.6% by weight after 24 hour exposure.

EXAMPLE 27

The following ingredients were combined with 500 milliliters (ml.) of water:

| Formula | |
|---|---|
| Vermiculite | 12.74 g. |
| PBI ¼" | 1.13 g. |
| Fluorocarbon Teflon ® Latex | 1.13 g. |

After stirring to form the dispersion, these ingredients were added to the following aqueous solution of cationic flocculant:

| | |
|---|---|
| Guanidine HCL | 80 g/4 liters (L) H2O |
| 5 cc 10% alum | |
| 8 cc 10% NA2CO3 (base) | |

Flocculation took place and the resulting slurry was gravity drained and the material was made into a sheet of paper on a wet press with a 600 psi g. (gauge) pressure.

The resulting paper was 0.008" (inch) thick. The following data was collected in testing the paper:

| Data | |
|---|---|
| Tensile Strength | 1607 psi |
| Tear Strength | 91 g. |
| Fold MIT | +5000 dbl folds |

Water Absorption: 41.5% by weight after 24 hour exposure.

EXAMPLE 28

The following ingredients were combined with 500 milliliters (ml.) of water:

| Formula | |
|---|---|
| Vermiculite | 12.74 g. |
| PBI ¼" | 1.13 g. |
| Carboxylic Acrylic (HYCAR ® 2671) Latex | 1.13 g. |

After stirring to form the dispersion, these ingredients were added to the following aqueous solution of cationic flocculant:

| | |
|---|---|
| Guanidine HCL | 80 g/4 liters (L) H2O |
| 5 cc 10% alum | |
| 8 cc 10% NA2CO3 (base) | |

Flocculation took place and the resulting slurry was gravity drained and the material was made into a sheet of paper on a wet press with a 600 psi g. (gauge) pressure.

The resulting paper was 0.007" (inch) thick. The following data was collected in testing the paper:

| Data | |
|---|---|
| Tensile Strength | 2248 psi |
| Tear Strength | 91 g. |
| Fold MIT | +5000 dbl folds |

Water Absorption: 30.5% by weight ater 24 hr. exposure.

EXAMPLE 29

The following ingredients were combined with 500 milliliters (ml.) of water:

| Formula | |
|---|---|
| Vermiculite | 12.74 g. |
| PBI ½" | 1.13 g. |
| Neoprene ® 735A Latex | 1.13 g. |

After stirring to form the dispersion, these ingredients were added to the following aqueous solution of cationic flocculant:

| | |
|---|---|
| Guanidine HCL | 80 g/4 liters (L) H2O |
| 5 cc 10% alum | |
| 8 cc 10% NA2CO3 (base) | |

Flocculation took place and the resulting slurry was gravity drained and the material was made into a sheet of paper on a wet press with a 600 psi g. (gauge) pressure.

The resulting paper was 0.008" (inch) thick. The following data was collected in testing the paper:

| Data | |
|---|---|
| Tensile Strength | 1781 psi |
| Tear Strength | 112 g. |
| Fold MIT | +5000 dbl folds |

Water Absorption: 28.3% by weight after 24 hour exposure.

EXAMPLE 30

The following ingredients were combined with 500 milliliters (ml.) of water:

| Formula | |
|---|---|
| Vermiculite | 12.74 g. |
| PBI ½" | 1.13 g. |
| Polyvinyidine Chloride Latex | 1.13 g. |

After stirring to form the dispersion, these ingredients were added to the following aqueous solution of cationic flocculant:

| | |
|---|---|
| Guanidine HCL | 80 g/4 liters (L) H2O |
| 5 cc 10% alum | |
| 8 cc 10% NA2CO3 (base) | |

Flocculation took place and the resulting slurry was gravity drained and the material was made into a sheet of paper on a wet press with a 600 psi g. (gauge) pressure.

The resulting paper was 0.008" (inch) thick. The following data was collected in testing the paper:

| Data | |
|---|---|
| Tensile Strength | 1946 psi |
| Fold MIT | +5000 dbl folds |

Water Absorption: 26.5% by weight after 24 hour exposure.

EXAMPLE 31

The following ingredients were combined with 500 milliliters (mL) of water:

| Formula | |
|---|---|
| Vermiculite | 13.65 g. |
| PBI ⅛" | 0.1 g. |
| PBI ¼" | 0.25 g. |
| PBI ½" | 0.25 g. |
| Fluorocarbon Teflon ® Latex | 2.55 g. |

After stirring to form the dispersion, these ingredients were added to the following aqueous solution of cationic flocculant:

| | |
|---|---|
| Guanidine HCL | 80 g/4 liters (4L) H2O |
| 5 cc 10% alum | |
| 8 cc 10% NA2CO3 (base) | |

Flocculation took place and the resulting slurry was gravity drained and the material was made into a sheet of paper on a wet press with a 600 psi g. (gauge) pressure.

The resulting paper was 0.008" (inch) thick. The following data was collected in testing the paper:

| Data | |
|---|---|
| Tensile Strength | 1592 psi |
| Tear Strength | 91 g. |
| Fold MIT | +5000 dbl folds |

Water Absorption: 49.2% by weight after 24 hour exposure.

EXAMPLE 32

A synthetic fluormica paper of the following composition was manufactured on a fourdrinier pilot plant machine:

| | |
|---|---|
| Taeniolite (A synthetic fluormica) (Regenerated) | 76.5% by weight |
| Polybenzimidazole fibers | 17.0% |
| Polyvinylidene chloride | 6.5% |
| TOTAL: | 100.0% |

Procedure:
The following fibrous slurry was prepared in a standard papermaking beater:

| | |
|---|---|
| PBI Fibers | 8.5 lbs. |
| ¼" Lengths | 2.83 lbs. |
| ½" Lengths | 5.67 lbs. |
| Water (deionized) | 63.4 gallons |

The fibers and water were beaten for ten minutes. The mixture was then combined with Topy® Li Taeniolite (38.2 lbs.) and polyvinylidene chloride latex (Geon® 660X13).

The mica, fibers and water were mixed together in the hydropulper for ten minutes after which time the polyvinylidene chloride latex (50% solids) was added. After one minute more mixing, flocculation was performed by pumping this mixture into a precipitation tank containing the following cationic flocculant solution:

| Deionized Water | 500 gallons |
|---|---|
| Guanidine HCL | 80 lbs. |
| Alum | 1.635 lbs. |
| Sodium Carbonate | 1.39 lbs. |

After another mixing period, the stock was pumped into the head box of the paper-forming unit. A paper of 25" in width was collected onto rolls after traveling over the drying drums of the paper manufacturing line.

The resulting paper was tested. The tests and data collected are listed below:

| TEST | RESULT |
|---|---|
| Thickness | 0.014" |
| pH | 8.37 |
| Water Absorption | 2 hr. 65.4% |
| | 24 hr. 81.6% |
| Tensile Strength | MD 757 psi |
| | AMD 609 psi |
| Elongation at Break T-494 | MD 1.25% |
| | AMD 1.7% |
| Elmendorf Tear TAPPI T-414 | MD 189 g |
| | AMD 149 g |
| MIT Fold (TAPPI T-423) | MD 584 dbl flds |
| | AMD 227 dbl flds |
| Mullen Burst (TAPPI T-403) | 33 psi |
| Density (TAPPI T-410) | 40.1 pcf |
| Dielectric Strength ASTM D-149 | 342 v/mil |
| Calendered | 529 v/mil |
| Toughness Index | MD 107 J/kg |
| | AMD 120 J/kg |
| Wax Pick Test (TAPPI T-459) | 2, pulls at 3 |
| Moisture at 65% RH | 4.5% |
| NBS Smoke Smoldering 16, Flaming 24, Mean 20 | |
| Vertical Burn Test F-501 | |
| 12 second duration | |
| Extinguish time | 0 seconds |
| Burn length | 1.0" |
| Glowing | 0 seconds |
| Dripping | 0 seconds |
| Pass/Fail | P |
| 60 second duration | |
| Extinguish time | 0 seconds |
| Burn length | 1.6" |
| Glowing | 0 seconds |
| Dripping | 0 seconds |
| Pass/Fail | P |

We claim:

1. A flocced mineral material which comprises (1) a binder and (2) a swelled layer silicate gel that has an average charge per structural unit that ranges from about −0.5 to about −1, said silicate containing at least some interstitial cations that have the formula [R$^1$C(R$^2$)R$^3$]+ wherein R$^1$, R$^2$, and R$^3$ are independently selected from NH$_2$ and CH$_3$; provided, however, that at least two or more of R$^1$, R$^2$, and R$^3$ are NH$_2$ but further providing that one or more of the hydrogen atoms of R$^1$, R$^2$, and R$^3$ may instead be a substitutent selected from: a C$_1$ to C$_5$ alkyl, a C$_2$ to C$_5$ alkenyl and a C$_2$ to C$_5$ alkynyl wherein these substituents may be linked to form one or more rings which may be saturated, unsaturated or aromatic; and further, provided that the silicate is a water swelling body of (a) vermiculite, (b) mica, or (c) a mixture of vermiculite and mica.

2. A material as described in claim 1 wherein the binder is a polymer.

3. A material as described in claim 2 wherein the polymer is a latex.

4. A material as described in claim 2 wherein the polymer is a resin selected from the group consisting of phenolic resin and melamine-formaldehyde resin.

5. A material as described in claim 3 wherein the latex is selected from the group consisting of: carboxylated acrylonitrile butadiene, polyvinylidene, chloride, polystyrene, styrene-butadiene latex, vinyl chloride latex, carboxylated butadiene styrene latex, fluoronated ethylene-propylene latex, acrylic latex, and tetrafluoroethylene latex.

6. The material of claim 1 made by a process wherein the binder was combined with a suspension of the body of (a) vermiculite, (b) mica, or (c) a mixture of vermiculite and mica followed by an ion exchange reaction which placed the interstitial cations into the said body, thereby causing silicate flocculation.

7. The material as described in claim 2 wherein the polymer is selected from: polyamide, polyamide-imides, polyetherimide, polysiloxanes, polyaryl sulfones, polyether sulfones, polyether-imide, polyphenylene oxide, poly carbonates, polyacrylate, polyphenylene sulfide, polyether keytone, polybutalyene terafalate, polyethylene, polyethylene terephalate, polypropylene, polypropylene terephalate, polyacrylate, and polyesters.

8. A material as described in claim 2 which also contains a fibrous material made from polybenzimidazole.

9. The material of claim 1 which also contains a fibrous material.

10. The material of claim 9 wherein the fibrous material is made from a substance selected from the group consisting of: carboxylated acrylonitrile butadiene, polyvinylidene chloride, polystyrene, polystyrene butadiene, polyvinyl chloride, carboxylated polybutadiene styrene, fluoronated polymers such as fluoronated polypropylene, fluoronated polyethylene, and fluoronated copolymers of polyethylene and propylene, polyamide, polyamide-imides, polyether-imides, polyaryl sulfone, polyether sulfone, polyether-imide, polyphenylene oxide, polycarbonates, polybenzimidazole, polyacrylates, polyphenylene sulfide, polyesthers, polyacrylate, polyphenyls, polyaramids, and polyacetates.

11. The material of claim 9 wherein the fibrous material is made of material selected from the group consisting of: silicone, boron, carbon, ceramic, glass, and metal.

12. A material as described in claim 1 wherein the binder is an organic oligomer.

13. A material as described in claim 1 wherein the binder is an epoxy.

14. A flocced mineral material which comprises:
(1) fibrous material in a form selected from the group consisting of: a woven substrate, a non-woven substrate and loose fibers; and (2) a swelled layer silicate gel that has an average charge per structural unit that ranges from about −0.5 to about −1.0, said silicate containing at least some interstitial cations that have the formula [R1C(R2)R3]+, wherein R1, R2, and R3 are independently selected from NH₂ and CH₃, provided, however, that at least two or more of R1, R2, and R3 are NH₂, but further providing that one or more of the hydrogen atoms of R1, R2, and R3 may instead be a substituent selected from: a $C_1$ to $C_5$ alkyl, a $C_2$ to $C_5$ alkenyl and a $C_2$ to $C_5$ alkynyl wherein these substituents may be linked to form one or more rings which may be saturated, unsaturated or aromatic; and further, provided that the silicate is a water swelling body of (a) vermiculite (b) mica, or (c) a mixture of vermiculite and mica, provided however, that the fibrous material was combined with a suspension of the body of (a) vermiculite, (b) mica, or (c) a mixture of vermiculite and mica, followed by an ion exchange reaction which placed the interstitial cations into the said body, thereby causing flocculation of the silicate.

15. The material of claim 14 wherein the fibrous material is made from a substance selected from the group consisting of: carboxylated acrylonitrile butadiene, polyvinylidene chloride, polystyrene, polystyrene butadiene, polyvinyl chloride, carboxylated polybutadiene styrene, fluorinated polymers such as fluorinated polypropylene, fluorinated polyethylene, and fluorinated copolymers of polyethylene and propylene; polyamide, polyamide-imide, polyether-imides, polyaryl sulfone, polyether sulfone, polyether-imide, polyphenylene oxide, polycarbonates, polybenzimidazole, polyacrylates, polyphenylene sulfide, polyesters, polyacrylate, polyphenyls, polyaramids, and polyacetates.

16. The material of claim 3 made by a process wherein the binder was combined with a suspension of the body of (a) vermiculite, (b) mica, or (c) a mixture of vermiculite and mica followed by an ion exchange reaction which placed the interstitial cations that have the formula previously indicated into the said body, said ion exchange reaction causing flocculation of both the latex and the silicate.

17. The material of claim 12 wherein the organic oligomer is an epoxy and is present in an amount of from about 0.5 to about 80% by weight.

18. The material of claim 1 wherein at least some interstitial cations are formed from a member selected from the group consisting of: guanidine, aminoguanidine, diaminoguanidine, methylguanidine, tetramethylguanidine, melamine, 2-aminopyridine, and 2,6-diaminopyridine.

19. The material of claim 3 wherein at least some interstitial cations are formed from a member selected from the group consisting of: guanidine, aminoguanidine, diaminoguanidine, methylguanidine, tetramethylguanidine, melamine, 2-aminopyridine, and 2,6-diaminopyridine.

20. The material of claim 6 wherein at least some interstitial cations are formed from a member selected from the group consisting of: guanidine, aminoguanidine, diaminoguanidine, methylguanidine, tetramethylguanidine, melamine, 2-aminopyridine, and 2,6-diaminopyridine.

21. The material of claim 9 wherein at least some interstitial cations are formed from a member selected from the group consisting of: guanidine, aminoguanidine, diaminoguanidine, methylguanidine, tetramethylguanidine, melamine, 2-aminopyridine, and 2,6-diaminopyridine.

22. The material of claim 12 wherein at least some interstitial cations are formed from a member selected from the group consisting of: guanidine, aminoguanidine, diaminoguanidine, methylguanidine, tetramethylguandine, melamine, 2-aminopyridine, and 2,6-diaminopyridine.

23. The material of claim 16 wherein at least some interstitial cations are formed from a member selected from the group consisting of: guanidine, aminoguanidine, diaminoguanidine, methylguanidine, tetramethylguanidine, melamine, 2-aminopyridine, and 2,6-diaminopyridine.

* * * * *